Nov. 12, 1957 W. M. ARCK 2,812,579
ADJUSTABLE GLASS-CUTTING TOOL HEAD
Filed June 15, 1953 2 Sheets-Sheet 1
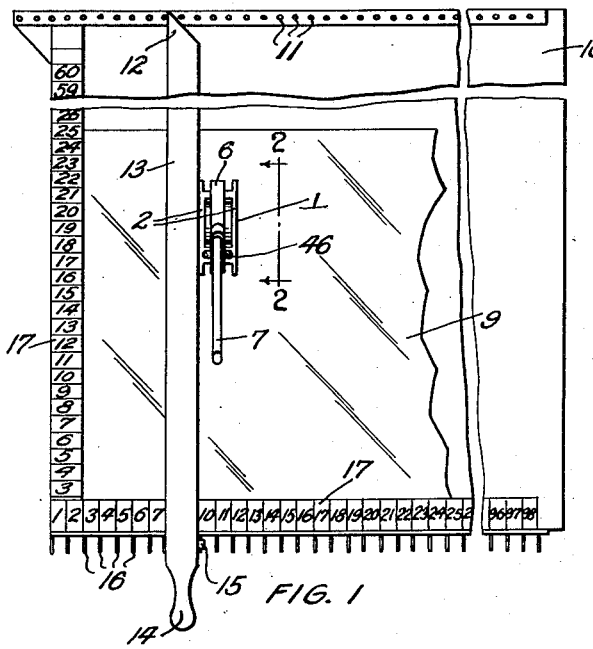
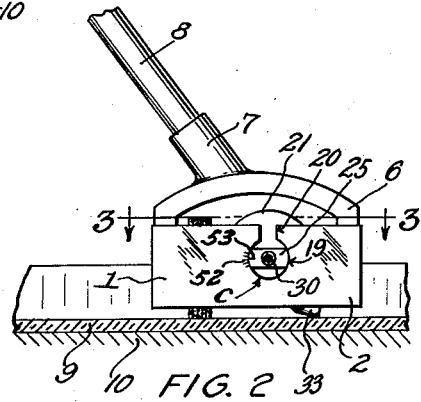
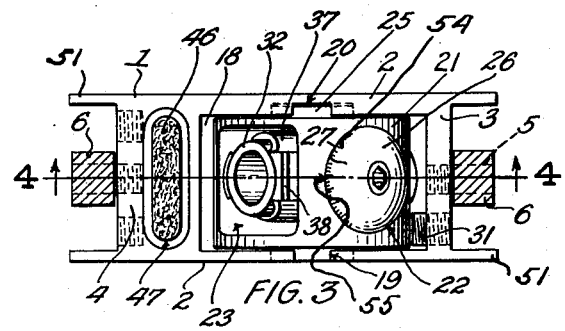
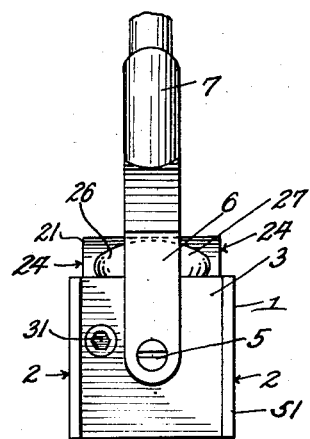
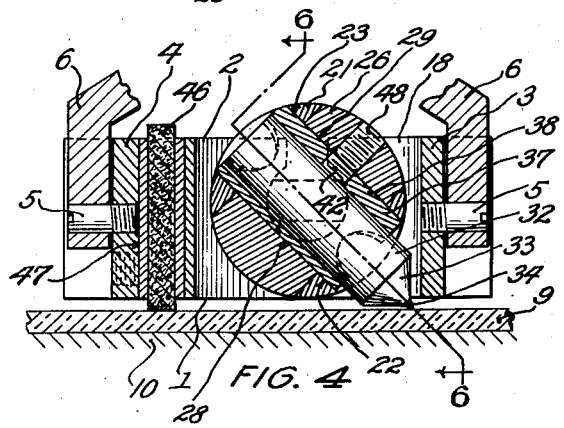
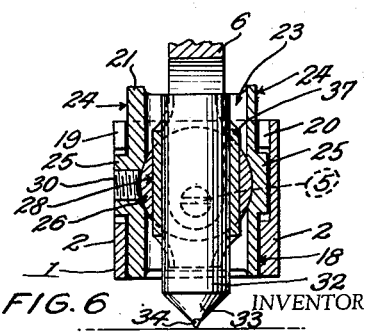
INVENTOR
William M. Arck
BY *J. A. Rambo*
ATTORNEY

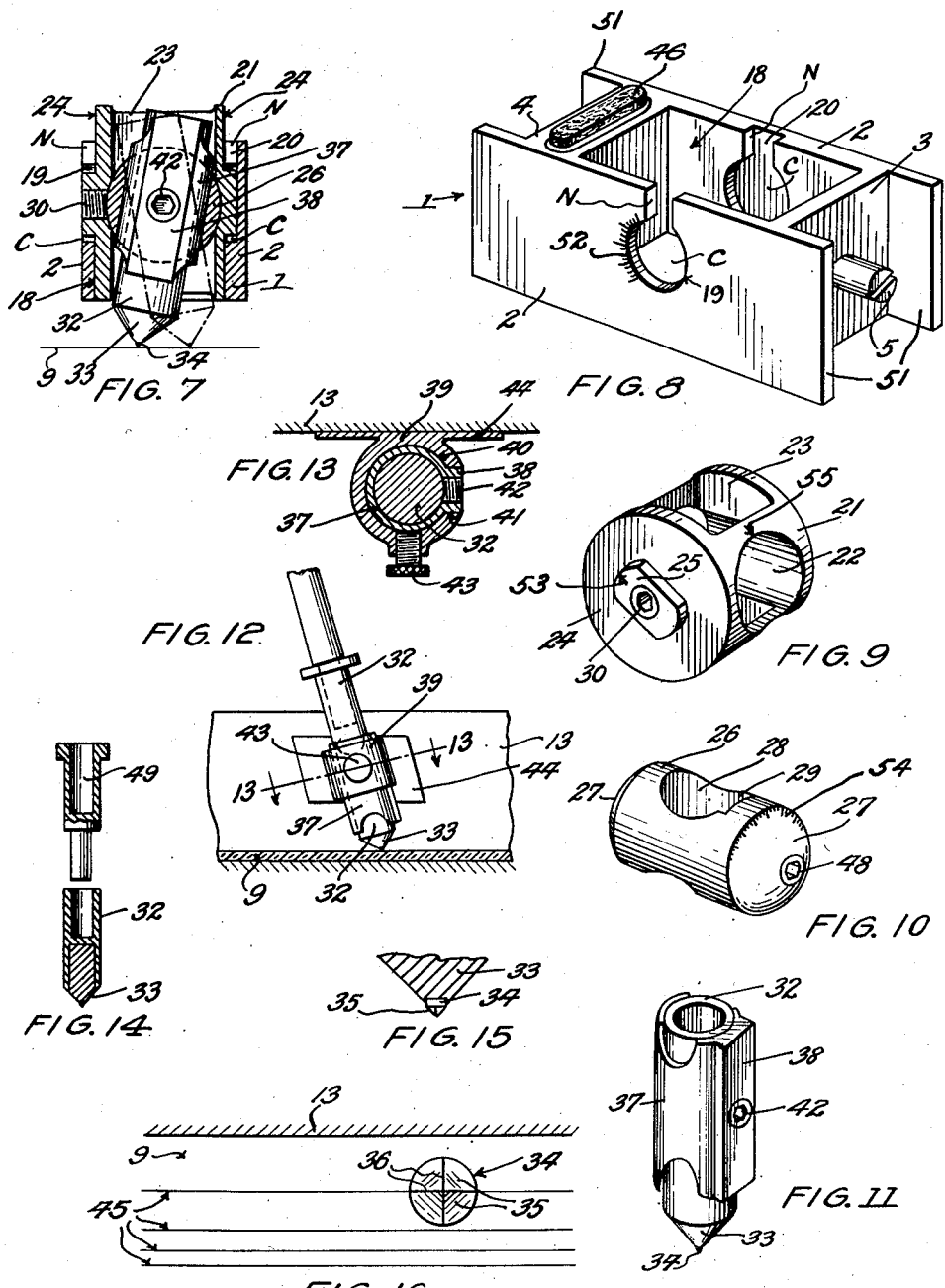

United States Patent Office 2,812,579
Patented Nov. 12, 1957

2,812,579

ADJUSTABLE GLASS-CUTTING TOOL HEAD

William M. Arck, Mount Vernon, Ohio

Application June 15, 1953, Serial No. 361,679

12 Claims. (Cl. 33—32)

This invention has reference to an improved glass-cutting tool, and particularly to tools of the type employing an outer block adapted for placement against the blade of an associated straight edge device for guided sliding movement along the same, and wherein the block includes a plurality of relatively adjustable internally positioned members adapted for the reception of a jeweled cutting stylus.

Cutting tools of this nature are used quite generally in the severance of sheet glass into panels of desired size. Thus, in the production of sheet glass, a continuous web or ribbon thereof is passed through an annealing leer and deposited on a cutting table where the web is cut transversely into individual sheets. The latter are then inspected and, if satisfactory, are further cut along prescribed lines to form smaller lights or panels of desired commercial proportions.

In performing such linear cutting of glass sheets, use is made, by the skilled craftsmen engaged in such operations, of the adjustable jewel-pointed cutting tools referred to above. As the same are presently formed, these cutting tools include stylus members having pointed or tapered cutting extremities carrying multiple-facet jewels. These stylus members are mounted for adjustment in movable devices retained in holder blocks, whereby the cutting edges of the jewels, which are formed at the junctures of each pair of adjoining facets, may be selectively disposed and maintained when actively positioned in parallelism with an associated straight edge or other ruling device and against which the block of the cutting tool is placed for guided longitudinal movement over a sheet of glass to be cut.

In the use of such cutting tools, the cutting edges of their jewel-tipped stylus members soon become worn, out of adjustment, or otherwise lose their effectiveness. Craftsmen using such tools are required at frequent intervals to adjust the operative positions of the stylus members in their block-carried mountings, in order to present in a proper manner an unworn cutting edge of a stylus jewel to the work to be cut. As presently constructed, such adjustment of a conventional glass-cutting tool is an extremely difficult and laborious task even for skilled craftsmen to execute. Further, the present construction of these tools is such that when a single specific adjustment is all that is required, it is now necessary to loosen the entire assembly of stylus-mounting parts to enable the desired single adjustment to be made. This condition often results in loss of correct adjustment of the loosened parts for which no adjustment originally was required.

It is, therefore, a primary object of the present invention to improve upon and simplify the construction of glass-cutting tools of the character set forth, particularly in the matter of forming the same so that necessary adjustments of the cutting edges of the jewel-tipped stylus members thereof may be made, whereby to present new or unused cutting edges to the work or to bring such cutting edges into desired parallelism with associated straight edge devices, the construction being such that said adjustments may be quickly, accurately, and conveniently effected.

Another important object of the invention is to provide a glass-cutting tool of the character indicated, wherein is provided an elongated stylus member having a cylindrical body which terminates in a conically tapered lower end and in which is mounted a multiple-facet jewel formed to include a plurality of intersecting point-forming cutting edges.

A further object is to provide in a tool of this character an improved mounting for the aforesaid stylus member by which the cutting edges of the jewel-tipped end thereof may be presented selectively, in a desired plane of operation, to the surface of a glass sheet to be cut thereby.

Still a further object of the invention is to provide in such a cutting tool an elongated cylindrical stylus member having a conically tapered jewel-tipped lower end and wherein improved mounting means are provided by which said member may be adjusted to and maintained in adjustment in any one or more of the following positions: (1) various positions of rotational adjustment about the principal longitudinally extending axis of the stylus member; (2) lengthwise of its principal axis; (3) bodily turning movement in a substantially vertical plane about a fixed horizontal axis perpendicularly intersecting the principal axis; and (4) turning or lateral tilting adjustment about a longitudinal axis perpendicularly intersecting the fixed horizontal axis, whereby to enable said stylus member to assume and maintain various operating positions.

Other objects of the invention are to provide in a glass-cutting tool of the type set forth an elongated cylindrical stylus member which is adapted to be adjustably received in an adapter sleeve for longitudinal and rotational movement therein and wherein set screw means are carried by the sleeve, bearing on the stylus member, to maintain the adjusted positions of the sleeve and member relative to each other; to provide a cutting tool of this category having a supporting block formed to include an internal chamber in which is received an adjustable stylus mounting, the latter embodying (1) a cage which is removably arranged in the chamber of said block for turning movement about a fixed horizontal axis, the cage having a bore formed therein for the reception of (2) a cylindrical spool member, the latter being axially turnable in the bore of said cage and being itself formed with a bore in which is provided a communicating keyway for the reception of a key formed externally and longitudinally on (4) an adapter sleeve in which a (5) cylindrical stylus member is adjustably mounted, the arrangement of these parts enabling the stylus member to swing bodily in a vertical plane about the pivotal union between the cage and the block; to swing or tilt laterally in angular relation to said vertical plane by the turning adjustment of the spool in the bore of the cage, and additionally to provide for sliding longitudinal and rotating adjustment of the stylus in the adapter sleeve; to provide means for obtaining easily, accurately and quickly a proper operating relationship between the stylus member and the adapter sleeve in which it is adjustably positioned, and through the key on said sleeve to maintain the accuracy of the relationship when the adapter sleeve, with the stylus member properly adjusted therein is inserted into the keyway-containing bore of the spool element of the mounting; and to provide a cutting tool which comprises generally an improvement upon prior cutting tools of an analogous character.

Other objects and advantages of the invention will become more apparent during the course of the following description when taken in connection with the accompanying drawings.

In the drawings, which form a part of this application and wherein like characters of reference are employed to designate like parts throughout the same;

Fig. 1 is a top plan view showing the glass-cutting tool of the present invention in position on a sheet of glass to be cut;

Fig. 2 is a side elevational view of the tool with the glass sheet shown in section and taken on the line 2—2 of Fig. 1;

Fig. 3 is an enlarged top view of the tool with its handle bail in section and taken on the line 3—3 of Fig. 2;

Fig. 4 is a vertical longitudinal sectional view taken through the tool on the line 4—4 of Fig. 3;

Fig. 5 is an end elevational view of the tool;

Fig. 6 is a transverse vertical sectional view taken through the tool on the line 6—6 of Fig. 4;

Fig. 7 is a similar view showing the lateral adjustment of the diamond-carrying stylus;

Fig. 8 is a detail perspective view of the holder block of my improved glass-cutting tool;

Fig. 9 is a similar view of the cage;

Fig. 10 is a detail perspective view of the stylus-mounting spool;

Fig. 11 is a similar view of the adapter sleeve and stylus;

Fig. 12 is a detail side elevational view showing the adapter sleeve and stylus when positioned in an initial testing device employed in establishing a correct relation between the sleeve and stylus;

Fig. 13 is a detail sectional view on the line 13—13 of Fig. 12;

Figs. 14 and 15 are sectional views of the stylus;

Fig. 16 is a diagrammatic view illustrating the arrangement of the diamond cutting edge of the stylus relative to an associated straight edge while using the holder device of Fig. 12 during a testing or glass-scratching operation.

The specific embodiment of the invention illustrated in the above-defined figures of the drawings discloses a single preferred form of my improved glass-cutting tool. While the following detailed description deals specifically with said form, it will be understood at this juncture that the same is but one of several practical adaptations in which the features and working principles of my invention may be found, and, therefore, said preferred form as here presented is to be construed as illustrative of the invention and not necessarily in limitation thereof.

As illustrated, the glass-cutting tool of the present invention comprises a fame lock 1 which is formed to provide an integral cubical body composed of transversely spaced, longitudinally extending and vertically positioned flat side walls 2. At their forward ends the walls 2 are united by a vertical transversely extending front wall 3 and at the rear thereof with a vertically disposed, transversely extending rear wall 4. Pivot studs 5 project horizontally and longitudinally from the center of the walls 3 and 4 and are adapted for reception in openings formed in the lower ends of a bail 6. The upper portion of said bail is formed with a socketed extension 7 for the reception of an upwardly and angularly extending handle 8 by which the block may be manipulated for sliding movement over the upper surface of a glass sheet 9 when the latter is positioned on a cutting table 10.

The table, which forms no part of the present invention, has been shown as being provided along one of its longitudinal edges with a longitudinal row of spaced upstanding pins 11 which may be selectively engaged with the angularly cut end 12 of a straight edge 13, or other equivalent ruling or guiding means. At its opposite end the straight edge 13 has been shown as being provided with the usual handle 14 and with a depending lug 15, the latter being selectively engageable with any one of a plurality of spaced pins 16 projecting rigidly outwardly in a horizontal plane from the longitudinal edge of the table 10, and which is disposed opposite to and parallel with that carrying the pins 11. By this arrangement, the straight edge may be positioned as desired in retained relationship with a selected pair of the pins 11 and 16, enabling the block when placed against the straight edge to be drawn along the same in a fixed course to produce precision cutting of the underlying glass sheet. In this instance the table has been shown as having certain of its margin provided with graduated measuring rules 17.

Within the block, and defined by its walls 2, 3 and 4, is a chamber 18 which is open at its top and bottom. As illustrated, one of the side walls 2 is formed, as shown in Fig. 8, with a keyhole slot 19, while the opposite wall 2 is formed on its inner surface with a correspondingly formed recess 20, the latter being disposed in registration with the slot 19, both the slot and the recess being each formed with an enlarged circular portion C disposed downwardly and in communication with an upwardly disposed restricted outlet neck N.

Adapted to be removably received in the chamber 18 is cage 21 of the construction shown specifically in Fig. 9. The cage, as here illustrated, comprises an integral hollow cylindrical body formed with a transversely extending and open-ended spool-receiving bore 22 and an intersecting stylus-receiving opening 23 which passes completely through the cylindrical body. The latter is formed to present flat circular ends 24 which have bearing contact with the inner surfaces of the block walls 2. The ends 24 are formed with integral outwardly projecting pivot abutments 25, the latter having arcuate ends which are united by straight parallel sides. The width of each abutment, as measured between the parallel sides, is such that when the cage is held so that the abutments are vertically positioned, the said abutments may be passed downwardly through the restricted necks N of the slot and recess 19 and 20 of the block, allowing the abutments to be rotatably seated in the enlarged circular portions C, since the diameter of each portion C is slightly greater than the length of the abutment 25 received therein, the length of the abutment being the linear distance present between the arcuate ends thereof. With this construction the cage may be rotatably positioned and supported in the chamber 18 of the block 1 for movement about a fixed horizontal axis.

Adapted to be removably positioned in the bore 22 of the cage is a spool 26. As shown in Fig. 10, this spool comprises a cylindrical body of uniform diameter throughout substantially its entire length, the opposite ends of the spool body terminating in convex heads 27. Midway of its length, the spool body is formed with a transversely extending open-ended stylus-receiving bore 28, the latter being formed at one side thereof with a coextensive keyway 29. The spool is rotatably received in the bore 22 of the cage 21 and is adapted to be held in desired positions of operational adjustment therein by a headless set screw 30 having a tool-receiving socketed end, the screw 30 being positioned in a threaded opening provided therefor in one of the abutments 25 of the cage 21, as shown in Fig. 6. The inner end of the set screw is adapted to impinge the outer cylindrical surface of the spool 26, holding the latter in various positions of angularly tilted rotational adjustment about its longitudinal axis, as in Fig. 7. Another set screw 31, shown in Fig. 3, is adjustably carried by the end wall 3 of the block and impinges the circular periphery of the cage to hold the latter securely in its various possible positions of rotational adjustment about the horizontal axis provided by the seating of the cage abutments 25 in the slot and recess 19 and 20 of the block 1.

Arranged to occupy the transverse bore 28 of the spool 26 is a stylus 32. The latter comprises a relatively short-length cylindrical body which terminates in a conically tapering lower end 33, the latter having a multiple-faceted cutting diamond or other glass-cutting jewel 34 stationarily embedded, as shown in Fig. 15, in its lower end. As shown in Fig. 16, each adjoining pair of the facets 35 define a cutting line 36, said lines being disposed in the form of the jewel illustrated in a cross-shaped manner. In the use of the tool, it is important in obtaining effective glass-cutting to arrange the stylus in its adjustable block-supported mounting so that one of said lines will be disposed in parallel order with the guide surface of the straight edge 13.

It is one of the chief objectives of the tool construction set forth to obtain quickly and precisely the desired adjustment of the stylus and its cutting jewel in securing straight edge parallelism. To this end, the stylus is removably received in a close-fitting adapter sleeve 37 and one side of this sleeve has integrally formed therewith a key 38 which is proportioned so that it may be snugly but slidably received in the keyway 29 of the spool bore 28 when the tool is assembled, as indicated in Figs. 4 and 6 of the drawings.

Prior to effecting such assembly, the proper or required relationship between the stylus 32 and the sleeve 37 to maintain a selected cutting line of the jewel in parallelism with the straight edge 13 is obtained by disposing the stylus and sleeve in a position-determining holder 39, illustrated in Figs. 12 and 13. The tubular or cylindrical body of this holder includes an open-ended bore 40 which is formed on one side thereof with a keyway 41 for the reception of the key 38 when the sleeve 37 carrying the same occupies the bore 40. The sleeve carries a headless, end-socketed set screw 42 which, upon being tightened, maintains the stylus in its adjusted position with respect to the sleeve 37 and its key 38. The set screw when loosened permits the stylus to be moved longitudinally of the sleeve bore 40 and/or to be rotated about its longitudinal axis.

When the desired relation between the stylus and sleeve has been thus established, the stylus and its sleeve are placed in the bore 40 of the holder 39, with the key 38 arranged in the keyway 41, as shown in Fig. 13. A thumb screw 43 carried by the holder body is then tightened to hold the sleeve and stylus in a desired position of longitudinal adjustment in the holder. The back of the holder includes an integral plate 44 having a flat rear surface which is adapted to be placed against the longitudinally extending ruling edge of the blade 13 so that the jewel-tipped end of the stylus may be slidably moved over a glass sheet to produce test lines 45 (see Fig. 16) which are known as "scratchings." By observing the relationship of these test lines or scratchings with respect to the blade or straight edge 13, the craftsman will be informed as to the desired and proper relationship of the stylus with respect to its sleeve. If the scratchings indicate that further adjustment is necessary it is a simple matter to remove the stylus and sleeve from the test holder and effect further adjustment therebetween to obtain the desired correct relationship.

When this relationship has been definitely established and made secure by the tightening of the set screw 42, the adjusted sub-assembly composed of the stylus 32 and sleeve 37 are then placed in the bore 28 of the spool 26, with the key 38 of the sleeve disposed in the keyway 29 of the bore 28. In the use of the tool desired relative positions of operation of the block 1, the cage 21 and the spool 26 are established and fixed by the tightening of the set screws 30 and 31. Thereafter the principal adjustment required is merely to change the operating positions of the cutting lines of the stylus jewel point. These lines after a certain period of use become dulled or worn and it is then necessary to partially turn the stylus in its sleeve so that a new or fresh cutting line may be presented to the work. The removal of the sleeve and stylus from the spool may be readily accomplished by loosening the set screw 48 which allows the sleeve and stylus to be adjusted longitudinally of or completely drawn out of the spool bore and keyway as a unit. When so removed, the stylus may be adjusted relative to the sleeve by loosening the set screw 42 and turning the stylus in the sleeve to approximately the desired position. The screw 42 is then re-tightened and the assembly is replaced in the test holder and the test scratchings made to determine the suitability of the approximated stylus-sleeve relationship. When the correct relationship has been thus established, the readjusted stylus and sleeve assembly are restored to the bore of the spool and fastened therein by tightening screw 48. In this restoration it will be noted that ordinarily it is unnecessary to disturb, vary or modify the working positions of relative adjustment of the block, the cage or the spool employed in the mounting of the stylus. This feature is of cardinal importance in the convenient but precise manner in which the tool of the present invention may be adjusted.

Another novel feature of the cutting tool resides in the fact that each adjustment of the stylus can be made without disturbing other adjusted part relationships. In all prior tools of this character, of which I am aware, all part adjustments and relationships are altered or disturbed when a single given adjustment is required, a condition which has been overcome in my cutting tool. Also the stylus employed in my improved cutting tool is shorter in length than those of the prior art. The shorter length enables the handle bail 6 to be quite low and positioned closely to the block 1, assuring better control of the tool when in active use. The upper end of the stylus, as shown in Fig. 14, may be formed with a removable extension having a socket 49 in which a removable handle, not shown, may be positioned when the stylus is operated in connection with the test holder 39. One or more felt wipers 46 for removing stylus-produced glass cuttings may be adjustably and removably mounted in a vertical slot 47 formed in the rear block wall 4, the lower end of the wiper having contact with the surface of the glass sheet.

The wiper, or wipers, removes foreign substances or glass cuttings from the upper surface of a glass sheet while the latter is being cut or scored by the cutting tool of the present invention. Also, the wiper, or wipers, supports the block 1 in spaced relation from and above the upper surface of a glass sheet, thereby preventing the metallic structure of the block from directly contacting the glass sheet during a cutting operation. The pins 5 may be slightly offset laterally with respect to a vertical plane passing through the true center of the tool, so that when the tool is lifted in a manner suspending the same from the handle 8 and its bail 6, it will automatically tilt to one side, thus making it easier for the operator to place properly the block against the sides of a straight edge. It will be noted that the depending legs of the bail are confined between transversely spaced flanges 51 which project longitudinally from the ends of the block at the sides thereof. The spacing of these flanges is such that the bail 6 of the handle may swing transversely of the block about the horizontal axis provided by the pins 5. This may be done while the block is being drawn along a straight edge, so that the block will retain its verticality even though the hand or wrist of the operator should waver or unduly tremble while a given scoring operation is being performed.

In order to index the various relative adjustments of the tool parts, the sides of the block 1 around the circumferential edge of the socket 19 are, as shown in Fig. 8, provided with graduations 52 and an indexing line or pointer 53 is formed with the trunnion 25 of the cage 21, as shown in Fig. 9, to register with the graduations 52 so that definite positions of adjustment of the cage relative to the block may be established, registered and renewed from time to time. Similarly, the rotational adjustments of the spool 26 relative to the cage 21 may be correspondingly metered. Thus one end of the cage may be provided with the peripherally disposed graduations 54 adapted for registry with an indicating pointer or reference line 55 provided on said cage adjacent the edge of the bore 22 therein.

In view of the foregoing it will be apparent that the present invention provides a tool for cutting sheet glass which is sturdy, simple and efficient in its construction and operation. The arrangement and formation of its parts enable the cutting stylus of the tool to be quickly, accurately and conveniently adjusted to secure its most effective operation. While I have shown the tool as being of the manually operated type, it is of course possible to incorporate its features into an automatic or power-driven machine without departing from the essential principles of the tool, and I, therefore, desire to include within the scope of my invention all such modifications or adaptations thereof that may be said to fall fairly within the scope of the following claims.

I claim:

1. A tool for cutting sheet glass, comprising: a slidable block formed with a chamber; a cage mounted in said chamber for rotatable adjustment about a substantially horizontal axis, said cage including a body formed with a spool-receiving bore and an intersecting stylus-receiving opening; a spool positioned in said cage bore for rotational adjustment about the longitudinal axis of the bore or bodily turning movement in unison with said cage about said horizontal axis; means for holding said cage positively in its positions of rotational adjustment about said horizontal axis; means for holding said spool in said bore and in its positions of rotational adjustment about the longitudinal axis of the bore, said spool having a body formed intermediately thereof with a relatively communicating stylus-receiving bore and keyway; a cylindrical styles having a conically tapered end; a multiple-facet cutting jewel rigidly carried by the tapered end of said stylus; an adapted sleeve in which said stylus is positioned for rotational and longitudinal adjustment; a key formed longitudinally with said sleeve, said key being receivable in the keyway of said spool when said sleeve and stylus occupy the bore of said spool and the opening in said cage; means carried by said spool for retaining said sleeve in its positions of longitudinal adjustment in the bore thereof; and means carried by said sleeve for retaining the stylus in its positions of rotational and longitudinal adjustment therein.

2. A tool for cutting sheet glass as defined in claim 1, and wherein the construction is further characterized by the provision of an operating handle having a bail at its lower end; and means pivotally joining the lower ends of said bail with the front and back portions of said block.

3. A tool for cutting sheet glass as defined in claim 1, and wherein the construction is further characterized by the inclusion of a wiping pad carried by the rear portion of said block, said pad being disposed so that the lower part thereof will engage the upper surface of a glass sheet undergoing cutting by said tool to remove glass cuttings from the path of cutter operation as the block is moved over the sheet.

4. A glass-cutting tool comprising a cubical block formed with an internal cell open at the top and bottom thereof; a cage rotatably positioned in said cell, said cage being formed with an open-ended spool-receiving bore and an intersecting stylus-receiving opening; trunnion extensions projecting from opposite sides of said cage for the rotatable support of said cage, said trunnions being removably received in bearing sockets formed in opposite side walls of said cell; a spool removably positioned in said bore for rotatable adjustment about the longitudinal axis thereof, said spool being formed intermediately of its length with a stylus-receiving bore and a communicating keyway, said spool bore being disposed in registry with the stylus-receiving opening in said cage; a stylus removably positioned in the bore of said spool, said stylus being formed at one end with a conically tapered jewel-tipped cutting point; a sleeve surrounding said stylus and in which said stylus is mounted for longitudinal sliding movement and rotational adjustment about its principal axis; and a key formed on said sleeve for interfitting reception in the keyway of said spool.

5. A glass-cutting tool as defined in claim 4 and wherein set-screw means are provided for maintaining the stylus in adjusted relation to said sleeve.

6. A glass-cutting tool as defined in claim 4 and wherein set-screw means are provided for maintaining the stylus in its various positions of relative adjustment with respect to said sleeve; to maintain said spool in its various positions of rotational adjustment about its longitudinal axis in the spool bore of said cage; in maintaining the sleeve and the stylus arranged therein in their various positions of longitudinal adjustment in the bore of said spool; and in maintaining said cage in its various positions of rotational adjustment about its horizontal axis of rotation as provided by the trunnion-forming extensions thereof when the latter occupy seated positions in the bearing sockets of said block.

7. A glass-cutting tool as defined in claim 4, and wherein the bearing sockets in said block for the reception of the trunnion extensions of said cage are of keyhole configuration, the same having relatively enlarged circular lower portions which terminate upwardly in open but restricted access necks; said trunnion extensions each having parallel linearly extending sides which terminate in arcuate ends, the width of each of said extensions as measured between said linear sides being less than the width of the restricted neck portion of each of said sockets to allow the extensions to pass through the same; and the length of each of said extensions being less than the diameter of each of the circular lower portions of said sockets in order to allow said extensions to be rotatably supported therein.

8. In a glass-cutting tool; a slidable frame block; a stylus mounting including an outer member; means for supporting said outer member in said block for rotational adjustment about a horizontal axis, an inner member bodily carried by said outer member for turning movement in unison therewith about said horizontal axis, said inner member further being independently rotatable about its longitudinal axis when positioned in said outer member, said inner member being formed midway of its length with an open-ended bore having a communicating keyway arranged coextensively and longitudinally at one side thereof; a stylus having a pointed jewel-tipped cutting end; a tubular element in which said stylus is mounted for adjustment lengthwise thereof and rotationally about its longitudinal axis; and a longitudinal key extension projecting rigidly and externally from said tubular element for removable reception in said keyway.

9. In a glass-cutting tool; a slidable frame block; a mounting member arranged in said block for turning movement about a substantially horizontally extending axis, said member being formed with a cylindrical bore having a longitudinal axis perpendicularly intersected by said horizontal axis and rotatable in the vertical plane of said member; a stylus support disposed in and extending longitudinally of said bore for rotational adjustment about said longitudinal axis, said support intermediately of its length being formed with a transversely-extending stylus-receiving opening, the longitudinal axis of said support opening intersecting the horizontal axis of turning movement of said mounting member and the longitudinal axis of the bore therein; a cutting stylus having a cylindrical body formed with a conical jewel-tipped cutting end; a sleeve in which said stylus is received for turning movement about the longitudinal axis of the body thereof, said stylus and sleeve being unitarily received in the opening of said mounting member-carried support; and key means for maintaining said sleeve against rotation in said support opening.

10. In a glass-cutting tool; a slidable frame block; a stylus mounting adjustable in said block for turning movement about a substantially horizontally disposed axis; a stylus carrier in said mounting rotatable bodily therewith about said axis and independently turnable about a longitudinal axis lying in the plane of turning movement of said member, said carrier being formed with a stylus-receiving socket; a stylus assembly unitarily insertable in and removable from the socket of said carrier, said assembly including a jewel-pointed stylus; a sleeve forming a part of said assembly and in which said stylus is rotatably adjustable about said longitudinal axis; means carried by said sleeve for maintaining the rotational adjustment of said stylus therein; and key means for maintaining said sleeve in an established predetermined position in the socket of said carrier.

11. A glass-cutting tool comprising a stylus assembly including a cylindrical body formed with a jewel-tipped conical end; a sleeve in which said body is mounted for rotational adjustment about its longitudinal axis; means carried by said sleeve and engageable with said body for retaining the latter in a selected position of rotational adjustment in said sleeve; a longitudinally extending key formed on said sleeve; and a mounting for said sleeve and stylus body including a frame block having a flat, straight edge-engaging surface, a primary frame member mounted in said block for bodily rotation about a substantially horizontally disposed axis, a secondary frame member carried by said primary frame member for unified rotation therewith about said horizontally disposed axis and for independent axial rotational adjustment about an axis perpendicular to said horizontally disposed axis, said secondary member being formed with a bore and an adjacent keyway in which said sleeve and key are received.

12. In a glass-cutting tool; a unitary stylus assembly comprising a cylindrical stylus body formed with a jewel-tipped, conically tapered, cutting end, a sleeve member formed with an internal cylindrical bore in which said body is positioned for axial rotational adjustment and having an external longitudinally extending key, and manually adjustable means carried by said sleeve member and accessible exteriorly thereof and engageable with said stylus body for maintaining the latter in a selected position of rotational adjustment in said sleeve member; and a mounting for said stylus assembly comprising a mounting body formed with a chamber to receive said sleeve member and stylus body and a keyway adjacent said chamber to receive the key of said sleeve to maintain said stylus assembly against axial rotational movement in said mounting body.

References Cited in the file of this patent

UNITED STATES PATENTS

| | | |
|---|---|---|
| 1,005,637 | Friebertshauser | Oct. 10, 1911 |
| 1,755,365 | Rowley | Apr. 22, 1930 |
| 2,243,778 | Stansel | May 27, 1941 |
| 2,470,444 | Philippe | May 17, 1949 |
| 2,557,148 | Schimmel | June 19, 1951 |

FOREIGN PATENTS

| | | |
|---|---|---|
| 657,995 | Germany | Mar. 18, 1938 |